(12) United States Patent
Krolski et al.

(10) Patent No.: US 12,227,377 B2
(45) Date of Patent: Feb. 18, 2025

(54) ENCLOSED FOAM RAMP

(71) Applicant: Motis Brands, Inc., Germantown, WI (US)

(72) Inventors: Robert Krolski, Kewaskum, WI (US); Carl Richter, Menomonee Falls, WI (US); Clint Berry, Rapid River, MI (US)

(73) Assignee: Motis, LLC, Germantown, WI (US)

(*) Notice: Subject to any disclaimer, the term of this patent is extended or adjusted under 35 U.S.C. 154(b) by 260 days.

(21) Appl. No.: 17/244,526

(22) Filed: Apr. 29, 2021

(65) Prior Publication Data

US 2021/0339968 A1 Nov. 4, 2021

Related U.S. Application Data

(60) Provisional application No. 63/018,030, filed on Apr. 30, 2020.

(51) Int. Cl.
*B65G 69/28* (2006.01)
*B65G 69/30* (2006.01)
*B66F 7/24* (2006.01)

(52) U.S. Cl.
CPC ........... *B65G 69/287* (2013.01); *B65G 69/30* (2013.01); *B66F 7/243* (2013.01)

(58) Field of Classification Search
None
See application file for complete search history.

(56) References Cited

U.S. PATENT DOCUMENTS

| 922,029 | A | * | 5/1909 | Pearce | B65G 69/30 |
| | | | | | 193/41 |
| 1,348,142 | A | * | 7/1920 | Jaeger | B65G 69/30 |
| | | | | | 411/921 |
| 2,272,334 | A | | 2/1942 | St Laurent | |
| 2,284,022 | A | * | 5/1942 | Schmeller, Sr. | E04B 5/10 |
| | | | | | 404/20 |
| 3,106,826 | A | * | 10/1963 | Freidel | E02B 3/068 |
| | | | | | 405/218 |
| 3,166,831 | A | * | 1/1965 | Keith | B29C 44/16 |
| | | | | | 29/890.039 |
| 3,328,818 | A | * | 7/1967 | Melcher | B65G 69/30 |
| | | | | | 52/309.16 |
| 3,420,023 | A | * | 1/1969 | Gregori | E04B 2/7403 |
| | | | | | 52/592.1 |
| 3,752,441 | A | | 8/1973 | Rogers | |

(Continued)

FOREIGN PATENT DOCUMENTS

BR 202014017171 U2 * 3/2016 ............ E04F 11/002
DE 2316502 A1 * 10/1974

OTHER PUBLICATIONS

International Search Report and Written Opinion for PCT Patent Application No. PCT/US2021/030168, mailed Jul. 28, 2021.

*Primary Examiner* — Thomas B Will
*Assistant Examiner* — Katherine J Chu
(74) *Attorney, Agent, or Firm* — Andrus Intellectual Property Law, LLP

(57) ABSTRACT

A ramp has a first end and a second end. The ramp includes a form core which has a first core surface and a second core surface. A metal skin is secured to and at least partially surrounds the form core. The metal skin forms at least a first skin surface secured to the first core surface and a second skin surface secured to the second core surface.

15 Claims, 7 Drawing Sheets

(56) References Cited

U.S. PATENT DOCUMENTS

| | | | |
|---|---|---|---|
| 3,976,209 A * | 8/1976 | Burton | B60P 1/435 |
| | | | 52/645 |
| 4,091,142 A * | 5/1978 | Elmore | B29C 44/386 |
| | | | 264/45.3 |
| 4,427,179 A | 1/1984 | Price | |
| 4,743,485 A * | 5/1988 | Ting | B32B 5/20 |
| | | | 428/110 |
| 4,761,847 A * | 8/1988 | Savage | B65G 69/30 |
| | | | 52/645 |
| 4,920,596 A | 5/1990 | Stevens | |
| 5,165,990 A | 11/1992 | Nakano | |
| 5,341,533 A | 8/1994 | Seitz | |
| 5,483,715 A | 1/1996 | Fogarty et al. | |
| 5,599,235 A | 2/1997 | Lynberg | |
| 5,671,496 A * | 9/1997 | Smith | A61G 3/061 |
| | | | 404/35 |
| 5,863,026 A | 1/1999 | Gano et al. | |
| 5,894,618 A | 4/1999 | Jacobsen et al. | |
| 5,946,756 A | 9/1999 | Mapp | |
| 6,044,511 A | 4/2000 | Frost et al. | |
| 6,129,412 A * | 10/2000 | Tanuma | B62D 25/2036 |
| | | | 296/65.02 |
| 6,267,082 B1 * | 7/2001 | Naragon | A01K 1/035 |
| | | | 119/849 |
| 6,418,861 B1 | 7/2002 | Flam | |
| 6,430,769 B1 * | 8/2002 | Allen | B65G 69/30 |
| | | | 16/376 |
| 6,517,051 B1 | 2/2003 | Cavanaugh | |
| 6,551,192 B1 | 4/2003 | Rieber et al. | |
| RE38,326 E | 11/2003 | Mapp | |
| 6,775,955 B1 | 8/2004 | Smith et al. | |
| D500,113 S | 12/2004 | Frey et al. | |
| D503,139 S | 3/2005 | Colak et al. | |
| 7,003,836 B2 | 2/2006 | Berg | |
| 7,114,210 B2 | 10/2006 | Heinz | |
| RE41,851 E | 10/2010 | Heinz | |
| 7,950,094 B2 * | 5/2011 | Bailie | B65G 69/30 |
| | | | 14/69.5 |
| 8,118,280 B2 | 2/2012 | Heinz | |
| 10,801,211 B2 * | 10/2020 | Grifhorst | E04F 11/002 |
| 11,352,797 B2 * | 6/2022 | Winter | E04F 11/002 |
| 11,440,754 B2 * | 9/2022 | Bunker, II | B65G 69/30 |
| 11,585,097 B2 * | 2/2023 | Grifhorst | E01H 5/10 |
| 2001/0044978 A1 | 11/2001 | Ware | |
| 2002/0125092 A1 * | 9/2002 | Nykoluk | A45C 13/02 |
| | | | 190/127 |
| 2002/0144364 A1 * | 10/2002 | Anderson | E01D 15/24 |
| | | | 14/69.5 |
| 2002/0178672 A1 | 12/2002 | Robinson et al. | |
| 2006/0027794 A1 | 2/2006 | Heinz | |
| 2006/0043350 A1 | 3/2006 | Branstetter | |
| 2007/0256379 A1 * | 11/2007 | Edwards | B32B 5/145 |
| | | | 52/309.9 |
| 2009/0189130 A1 | 7/2009 | Heinz | |
| 2009/0255066 A1 | 10/2009 | Brock | |
| 2017/0253164 A1 * | 9/2017 | Delanghe | B65G 69/28 |
| 2019/0383022 A1 * | 12/2019 | Winter | B65G 69/30 |
| 2021/0025172 A1 * | 1/2021 | Grifhorst | E04F 11/002 |
| 2023/0150781 A1 * | 5/2023 | Borkholder | B65G 69/30 |
| | | | 14/69.5 |

\* cited by examiner

ENCLOSED FOAM RAMP

CROSS-REFERENCE TO RELATED APPLICATIONS

The present application claims priority of U.S. Provisional Patent Application No. 63/018,030, filed on Apr. 30, 2020 and which is incorporated by reference herein in its entirety.

BACKGROUND

The present disclosure relates to vehicular ramps of the type that are commonly used to service motor vehicles by driving the vehicle up a pair of the ramps aligned with each wheel of the front or rear wheels of the vehicle. The present disclosure is also related to access ramps of the form that span between two points and which may be flat, inclined or declined. Such ramps may span between a loading dock and a trailer, a span from a trailer to the ground, or may span over the top of a set of stairs. U.S. Pat. Nos. 8,347,439 and 8,061,943 are two patents that provide additional examples of ramps and ramp configurations as known in the art. U.S. Pat. Nos. 8,347,439 and 8,061,943 are hereby incorporated by reference in their entireties.

Commonly, such ramps may be formed of steel which produces a strong, economical ramp but one which is heavy and thus presents a challenge for storage, transportation, and intermittent use.

Other ramps may be molded from plastic with internal ribs that extend between external walls of relatively thin widths to achieve adequate strength. While often lighter than steel, plastic ramps of sufficient strength for industrial or commercial purposes are still heavy so to present similar challenges of steel constructed ramps. Examples of these ramps are disclosed by U.S. Pat. No. 5,483,715 entitled "Vehicle Service Ramp," and U.S. Pat. No. 7,003,836 entitled, "Portable Car Ramp," both of which are incorporated by reference in their entireties.

Still further ramps, for example, as disclosed in U.S. Pat. No. RE41651, entitled "Ramp and Method of Construction," which is hereby incorporated by reference in its entirety, are constructed of an expanded plastic form with a protective coating for durability. The inventors have identified that the field of vehicular ramps is ripe for still further improved ramp construction and design to increase strength while reducing weight and improving device mobility.

BRIEF DISCLOSURE

Figure 1:
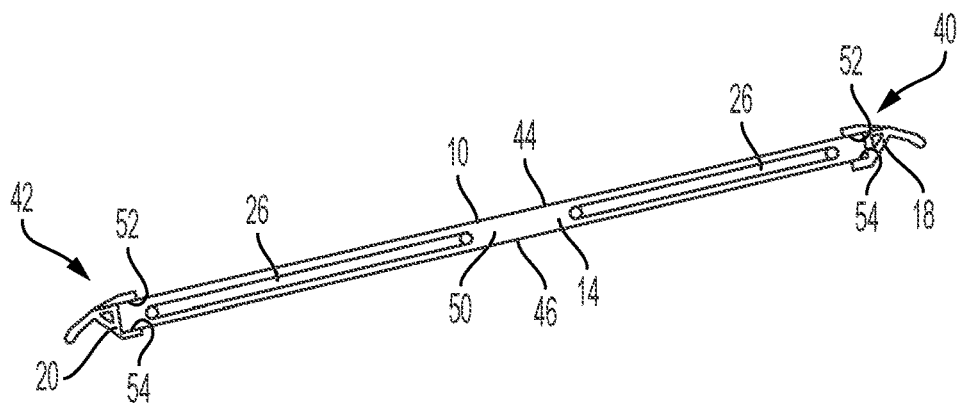
FIG. 1 is a side view of an example of a ramp of the present construction.

An example of a ramp has a first end and a second end. The ramp includes a form core which has a first core surface and a second core surface. A metal skin is secured to and at least partially surrounds the form core. The metal skin forms at least a first skin surface secured to the first core surface and a second skin surface secured to the second core surface.

In further examples of the ramp, the form core is a cellular form of a material selected from polypropylene, polyisoprene, polystyrene, or polyethylene. The form core may be constructed of expansive form injected into an interior defined by the metal skin. The ramp may include at least one hook secured to the first skin surface and the second skin surface at either the first end or the second end of the ramp. The metal skin of the ramp may further include a first skin side connecting the first skin surface to the second skin surface and the first skin side is secured to a first core side of the form core. The metal skin of the ramp may further include a second skin side opposite the first skin side, the second skin side connecting the first skin surface to the second skin surface and the second skin side is secured to a second core side of the form core. The metal skin may be a unitary construction.

An adhesive may be used to secure the metal skin to the form core. A hinge may be secured to the metal skin. A handle may be secured to the metal skin. A distance between the first skin surface and the second skin surface may increase from the first end of the ramp to the second end of the ramp.

The metal skin may be a unitary construction that includes the first skin surface and second skin surface connected by a first side surface and a second side surface. The first and second skin surface and the first and second side surface of the metal skin define an open interior. The form core is constructed of an expansive form injected into the open interior which adheres to the metal skin upon curing into the solid form core. An acrylic adhesive tape may secure overlapping ends of the metal skin to define the open interior.

The metal skin may include a C-shaped portion secured to at least three sides of the form core. The ends of the C-shaped portion may secure across a portion of a fourth side of the form core. The metal skin my further include a planar portion that secures between the ends of the C-shaped portion and across the fourth side of the form core.

In examples, the ramp may increase in a thickness dimension from a first thickness at a first end of the ramp to a second thickness at a center of the ramp in a lengthwise dimension. The second thickness is greater than the first thickness. The ramp may increase in a thickness dimension from the first thickness at a first side of the ramp to the second thickness at the center of the ramp in the lengthwise dimension.

In still further examples, the ramp is constructed within an injection fixture that includes covers removably secured to sidewalls. The injection fixture defines an open interior which is configured to receive the metal skin and to hold the metal skin under tension. The form may be an expansive form injected interior of the metal skin within the injection fixture. As the expansive form expands and cures, the expansive form adheres to the metal skin and deforms the metal skin outwards against the covers of the injection fixture.

An example of a ramp system includes a first ramp portion, a second ramp portion, and a hinge. The first ramp portion has first and second ends and first and second sides. The first ramp portion has a first form core having a first core surface and a second core surface. The first ramp portion has a first metal skin secured to, and at least partially surrounding, the form core. The first metal skin forms at least a first skin surface secured to the first core surface and a second skin surface secured to the second core surface. The second ramp portion has first and second ends and first and second sides. The second ramp portion has a second form core having a first core surface and a second core surface. The second ramp portion has a second metal skin secured to and at least partially surrounding the second form core. The second metal skin includes at least a first skin surface secured to the first core surface and a second skin surface secured to the second core surface. A hinge is secured between the first ramp portion and the second ramp portion. The first and second ramp portions are pivotable about the hinge between an open position wherein the first skin surface of the first metal skin is planar with the first skin surface of the second metal skin and a closed position wherein first skin surface of the first metal skin faces the first skin surface of the second metal skin.

In further examples of the ramp system, hooks are secured to the first metal skin at the first and second ends of the first ramp portion and hooks are secured to the second metal skin at the first and second ends of the second ramp portion. The first metal skin may further include a third skin surface secured to the first skin surface and the second skin surface and secured to the first form core at a side of the first ramp portion opposite the hinge. The second metal skin may further include a third skin surface secured to the first skin surface and the second skin surface and secured to the second form core at a side of the second ramp portion opposite the hinge. A first handle may be secured to the third skin surface of the first metal skin. A second handle may be secured to the third skin surface of the second metal skin.

In other examples of the ramp system, the hinge is a first hinge. A third ramp portion includes first and second ends and first and second sides. The third ramp portion includes a third form core having a first core surface and a second core surface. The third ramp portion includes a third metal skin secured to and at least partially surrounding the form core. The third metal skin forms at least a first skin surface secured to the first core surface and a second skin surface secured to the second core surface. A fourth ramp portion includes first and second ends and first and second sides. The fourth ramp portion includes a fourth form core having a first core surface and a second core surface. The fourth ramp portion includes a fourth metal skin secured to and at least partially surrounding the fourth form core. The fourth metal skin includes at least a first skin surface secured to the first core surface and a second skin surface secured to the second core surface. A second hinge is secured between the first end of the third ramp portion and the second end of the first ramp portion. A third hinge is secured between the first end of the fourth ramp portion and the second end of the second ramp portion.

DETAILED DISCLOSURE

Ramps 10 include span ramps or bridges are ramps that are configured to be supported at either of opposed ends 40, 42 and must have the strength to support the intended load in the middle of the ramp, or the furthest point from the supports at the ends 40, 42. The inventors have discovered that by combining a metal skin 14 with a form core 12, a ramp 10 can be constructed that has a surprisingly greater strength than either of these structures taken separately. The metal skin 14 for example includes a top surface 44, a back surface 46 and side surfaces 48, 50. Furthermore such constructions provide this improved strength at a lower overall weight than would be required if a similar strength were to be achieved using either material alone.

In examples, the metal skin 14 may be aluminum, stainless steel, or other metals as will be recognized from the present disclosure. The form core 12 is a cellular form that is exemplarily formed of Polypropylene (PP), Polyisoprene (PI), Polystyrene (PS), Polyethylene (PE), or other similar polymers. Still further examples include polyurethane, polyurea, or hybrids combining both polyurethane and polyurea. The form core is exemplarily an expansible form that is delivered or otherwise injected in a liquid form but expands and hardens as it cures. The form core provides the general shape and structure of the ramp 10. It will be recognized that the form core may include a combination including one or more of the materials listed above.

FIG. 1 depicts an example of a ramp 10 in the form of a span configured to extend between two surfaces upon which the ramp 10 rests at either end. The ramp 10 may include a hook 18 secured to one end 40 and a hook 20 secured to the other end 42. It is recognized that the hooks may take various forms depending upon specific use cases, spans, or supports with which the ramp is configured to be used. The hooks 18, 20 may be different in construction and design, or may be the same. In an example, at least one hook may be configured as a foot or otherwise configured for ground contact. While in other examples, a hook may be configured for removable attachment to other structures as described in the references incorporated by reference above. The hooks 18, 20 may include fastening plates 52 and 54 which are extensions of the hook 18, 20 configured for engagement with the ramp 10, and in particular configured for engagement with the metal skin 14 of the ramp 10. The fastening plate 52 is configured to engage the top surface 44 of the metal skin 14 while fastening plate 54 is configured to engage the back surface 46. In examples, the fastening plates 52, 54 provide contact surface area for engagement between the hook 18, 20 and the metal skin 14 to promote the securement therebetween for example, by way of welding, adhesive, or adhesive tape.

In an example, the hooks 18, 20 may be symmetrical in shape to promote ease of deployment. Furthermore, the hook 18 and the foot 20 may be constructed of metal and thus may be welded to the metal skin 14 for a secure connection of these components. In still further examples, the metal skin 14 may be too thin or of an alloy (e.g. 7075 aluminum) which does not permit or facilitate joining of components of the metal skin by welding. In such examples, the hooks may be secured to the metal skin 14 at the ends 40, 42 of the ramp 10 with adhesives, adhesive tape, fasteners, or other form of securement as will be recognized from these examples. As an example of adhesive tape and acrylic adhesive on a paper, PE, PET or similar liner may be used. VHB™ Metal Fabrication Tapes available from 3M™ are examples of adhesive tape which may be used to join components of the ramp as described herein. In still further examples, the form core 12 may be used to fully or partially secure the hooks 18, 20 to the ramp 10, as will be described in further detail herein. The ramp 10 may further include handles 26. The handles 26 may similarly be secured to the metal skin 14 through welding, adhesive, or adhesive tape between metal of the handles 26 and the metal skin 14, while other forms of securement like fasteners or crimping may also be used. In still further examples, the handles 26 may include fastening plates as described above with respect to the hooks to engage the respective surfaces 44, 46 of the metal skin 14.

Figure 2:
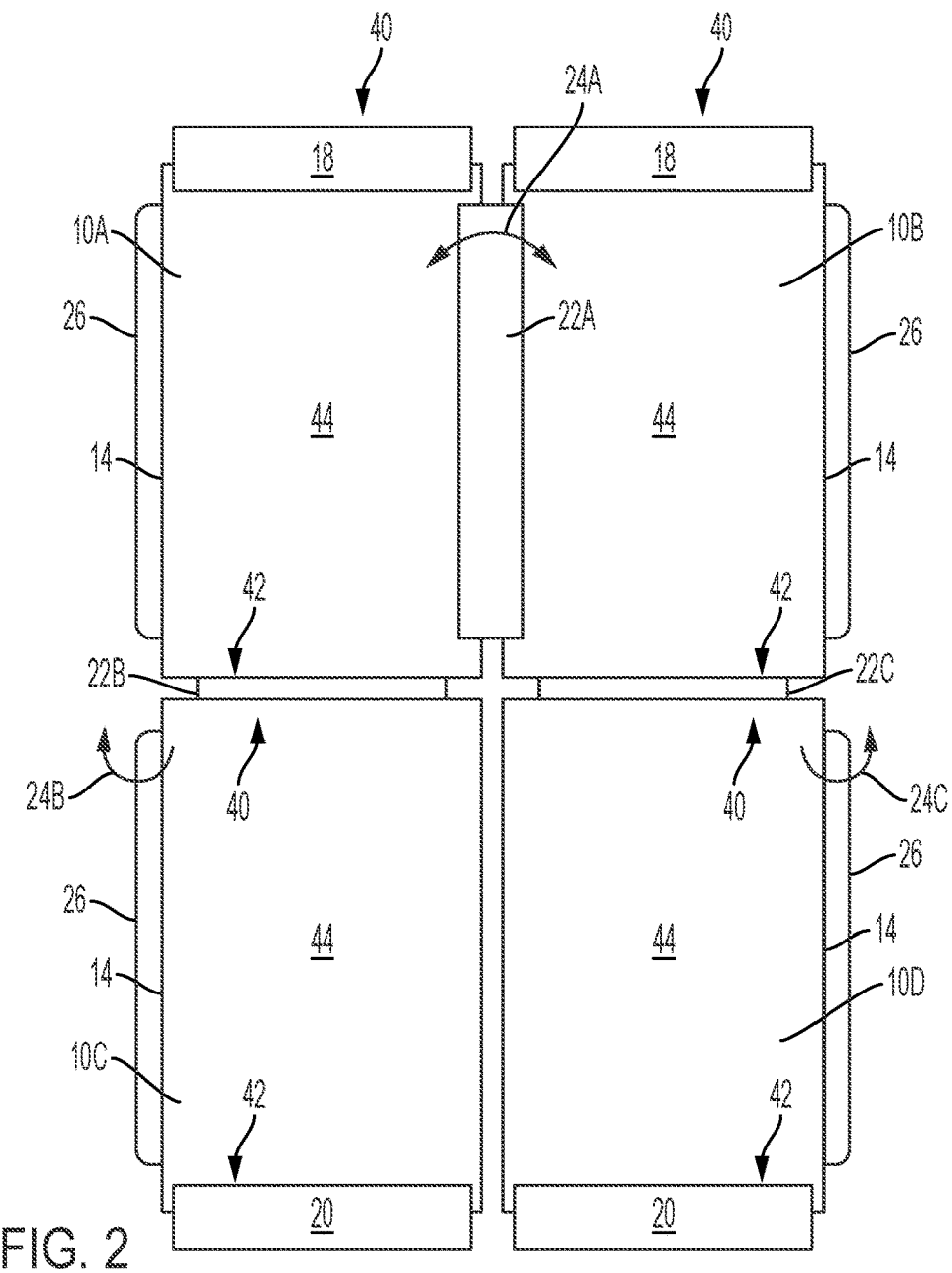
FIG. 2 is an top view of an example of a ramp of the present construction.

FIG. 2 is a top view of an example of the ramp 10. The ramp 10 is constructed of a plurality of ramp portions 10A, 10B, 10C, 10D, although it will be recognized that other examples may be constructed using more or fewer ramp portions. In an example, the ramp 10 may be constructed as a bi-fold ramp using only ramp portions 10A and 10B. While in the example depicted in FIG. 2, four ramp portions are used to provide a ramp that folds in both the lengthwise dimension and the widthwise dimension. The ramp portions 10A-D are connected to an adjacent ramp portion 10A-D with the use of at least one hinge 22. The hinge 22 may also be constructed of metal and welded to the metal skin 14 of each of the ramp parts 10A, 10B. In a still further example, the hinge 22 may be constructed of other materials, including, but not limited to nylon or other similar materials and adhered or riveted to the ramp. Hinges 22A-C provide examples of the hinges that pivotably connect adjacent ramp portions. In the example shown in FIG. 2, the hinge 22A is secured to the metal skin 14 along the lengthwise dimensions of ramp portions 10A and 10B. The ramp portions 10A and 10B pivot about the hinge 24A relative to each other about arrow 24A between an open position wherein the surface 44 of the metal skin 14 of both ramp portions 10A, 10B is planar and a closed position wherein the surfaces 44 of the metal skin 14 face each other.

FIG. 2 further depicts the optional example wherein ramp portions 10C and 10D are further connected at ends 42 of respective ramp portions 10A and 10B. In such an example, each ramp portions 10A-10D each extends between respective ends 40, 42, while the end 40 of ramp portions 10A and 10B further define the end 40 of the ramp 10 while the ends 42 of ramp portions 10C and 10D define the end 42 of the ramp. Ramp portion 10A is aligned end-to-end with ramp portion 10C, and such ramp portions are connected by a hinge 22B. In an example, the ramp portions 10A and 10C are configured to pivot about the hinge 24B relative to each other about arrow 24B between an open position wherein the surface 44 of the metal skin 14 of both ramp portions 10A, 10C are planar, and a closed position wherein the surface 44 of the metal skin 14 are positioned towards each other. It is recognized that the hinge 22B may be secured to the back surface 46 of the metal skin 14 and therefore arrow 24B may represent pivoting in a different direction as compared to arrow 24A. While hinge 22B and ramp portions 10A and 10C have just been described, it is recognized that hinge 22C and ramp portions 10B and 10D may operate in a manner similar to that as described with respect to hinge 22B and ramp portions 10A and 10C. Similarly, it is recognized that the hinge 22A may be secured to opposite sides of ramp portions 10A and 10C and likewise operate in the manners as described above with respect to hinge 22B.

Figure 3:
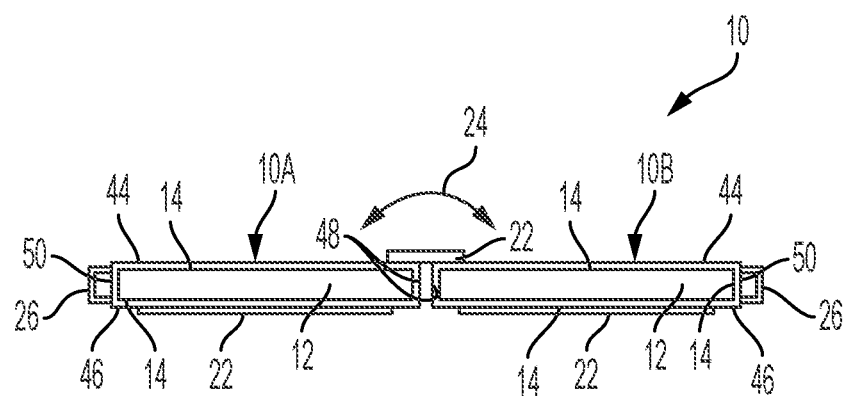
FIG. 3 is a cross-sectional view taken along line 3-3 of FIG. 2.

FIG. 3 is a cross-sectional view taken along line 3-3 of FIG. 2. FIG. 3 shows the form core 12 and the metal skin 14 surrounding the form core 12. As will be explained in further detail herein, the form core 12 and the metal skin 14 may take a variety of configurations. The metal skin includes a top surface 44, a back surface 46 and side surfaces 48, 50. As will be explained in further detail herein, while these portions of the metal skin are called out for identification purposes, the metal skin 14 as described herein may be of a unitary construction, each of the surfaces 44, 46, 48, 50 provided separately and which may be joined to one another, or some combination thereof. All such arrangements are considered to be within the scope of the present disclosure.

Exemplarily, side surfaces 48 are presented in FIG. 3 as interior sides in a ramp including multiple ramp portions 10A, 10B, that is that interior side surfaces 48 face one another when the ramp 10 is in the open configuration. Exemplarily side surfaces 50 are presented in FIG. 3 as exterior side surfaces 50 in a ramp including multiple ramp portions 10A, 10B, that is that exterior side surface 48 face outwards when the ramp 10 is in the open configuration. It will be recognized that for example, hinges 22 may be secured near or adjacent to interior side surfaces 48, while handles 26 may be secured near or adjacent to exterior side surfaces 50. It will be further recognized that in examples of the ramp 10 with a single ramp portion (e.g. 10A) or with two ramp portions connected end to end (e.g. 10A, 10C) that such ramp configurations may have two exterior side surfaces 50, while an example of a tri-fold ramp may include a middle ramp portion with two interior side surfaces 48. While FIG. 3 presents the hinge 22 secured to top surfaces 44 is recognized and within the present disclosure that the hinge 22 may be secured to the back surfaces 46 between the ramp portion 10A and ramp portion 10B.

Examples of the metal skin 14 as shown and described herein may include a number of configurations. The metal skin 14 includes at least the top surface 44 and the back surface 46. The inventors have discovered that when the ramp 10 is in use, the top of the ramp is placed in compression while the bottom of the ramp is placed in expansion, but that the form core 12 secured between the top surface 44 and the bottom surface 46 of the metal skin 14, transfers the force between the top surface 44 and the bottom surface 46 of the metal skin 14 distributing the force and greatly improving beam strength for the weight and span. The form core 12 also resists bending of the metal skin of the top surface 44 to the compression forces and bending of the back surface 46 of the metal skin to the expansion forces, thereby strengthening that structure as well. The addition of side surfaces 48, 50 have further been found to increase the strength of the ramp 10. In one such example, the metal skin 14 may have a "C" shape, surrounding the form core 12 on three sides. In such an example, the three sides of the form core 12 may include the top surface 44, back surface 46, and the exterior side surface 50. This exemplarily leaves the form core 12 exposed at the interior sides, which exemplarily face each other when the ramp 10 is in the open condition, while maintaining many of the advantages as described herein. However, other configurations and arrangements of the metal skin 12 will be shown and described in further detail herein, any of which may be used within examples of the ramp 10 as shown and described while remaining within the scope of the present disclosure.

Figure 4:
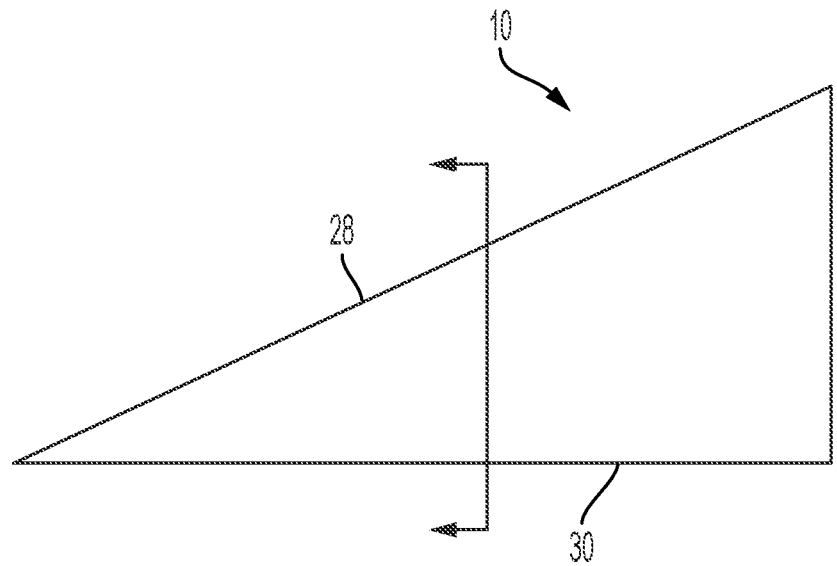
FIG. 4 is an example of a ramp of the present construction.
Figure 5:
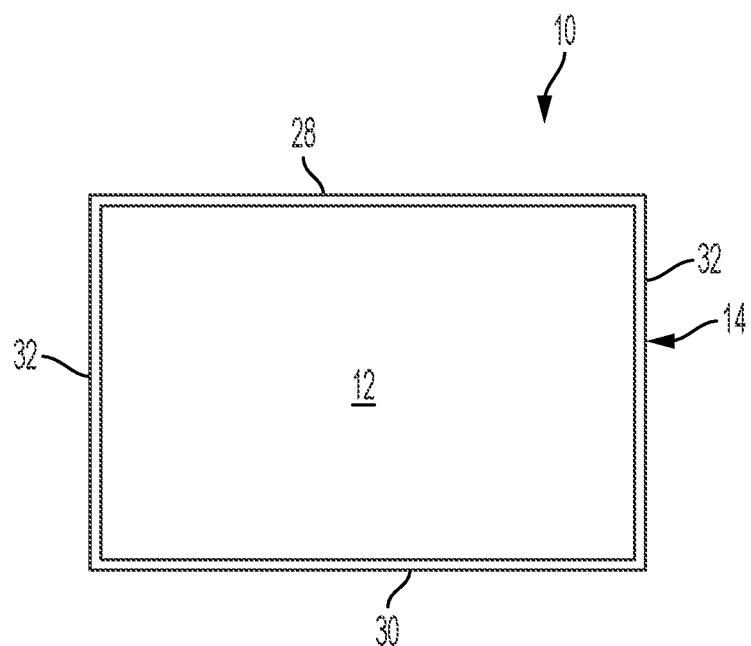
FIG. 5 is a cross-sectional view taken along line 5-5 of FIG. 4.

FIG. 4 is an example of a ramp 10 of the present construction in the form of a wedge. FIG. 5 is a cross-sectional view taken along line 5-5 of FIG. 4. In a wedge format of a ramp 10, the ramp includes a metal skin 14, exemplarily with a top surface 44, back surface 46 and side surfaces 48, 50. In contrast to a span form, the wedge form is generally configured for contact between the back surface 46 and an object. The back surface 46 thus may form a base upon which the ramp can rest on a surface, for example, a floor or the ground. While not depicted, the tread top surface 44 and the back surface 30 may be treated with further surface texture or gripping elements. The surface texture may be a surface abrasion or a texture coating of a combination of a polymer and a grit. In other examples, physical elements, for example ribbed plates or rebar may be welded to one or the other of the top surface 44 or the back surface 46 to provide grip or texture. It will be recognized that while the ramp 10 of FIG. 4 does not depict hooks, or handles, that such features may similarly be incorporated into this example of the ramp 10.

The cross-sectional view of FIG. 5 shows the form core 12 surrounded by the metal skin 14. As will be described in further detail herein, the metal skin 14 may be provided in a number of exemplary configurations. FIG. 5 provides a first example of the metal skin 14 being provided in two parts, one part includes the top surface 44 and the opposed side surfaces 48, 50 of the metal skin 12, while the other part includes the back surface 46 of the metal skin 12. As will be described in further detail herein, the two parts of the metal skin may be joined using welding, adhesive tape, adhesive, rivets, or thru bending of the metal to create the joint.

FIG. 6 provides a variety of examples of various manners of construction of the metal skin 14 about the form core 12. It will be recognized that these examples are schematic in nature and are not limiting on the dimensions of the examples disclosed thereby. It will be seen that in all of the examples A-F provided in FIG. 6, that the metal skin 14 includes at least the top surface 44 and the bottom surface 46. Many other examples include at least one side surface 48, 50, and in other examples, includes two side surfaces 48, 50. In examples, the metal skin is constructed of 5000, 6000, or 7000 series aluminum and having an exemplary thickness between 16 gauge and 24 gauge. As examples the metal skin may be 0.020-0.030 thick. One example may use 7075 aluminum. Still further examples may be constructed with stainless steel. Other dimensions and/or constructions may also be recognized in view of this disclosure.

Selection of the configuration of the metal skin 14 depends in part upon the manner in which the ramp 10 is constructed. In one example a solid form core 12 is provided and the metal skin 14 is secured to the form core 12 with an adhesive. In such an example, the surfaces 44, 46, 48, 50 of the metal skin may be secured individually to the form core and then joined to one another or need not be joined. In a related example, the metal skin 14 may be bent or formed about the form core 12. It will be recognized that any of the constructions of the metal skin from examples of 6A-G may be used with this construction.

However, in a further example as will be detailed herein, the metal skin 14 is formed first, and the form core 12 is injected as a liquid and subsequently expands and cures within the metal skin 14. In these constructions, the metal skin 14 forms a mold and the form fills and cures within the interior defined by the metal skin. Examples of FIGS. 6A, 6B, 6D, 6F, and 6G and others which will be recognized from those examples may be used with such constructions as the metal skin 14 is configured to retain the form core 12 within the metal skin 14. The composition of the form may be such that as the form expands and cures, the form itself forms a bond directly to the interior of the metal skin 14.

In examples, the metal skin 14 may be a unitary construction, for example as an extrusion. In another example, as shown in 6D, the metal skin 14 is constructed of a single piece of metal that is bent to form the top surface 44 and side surfaces 48, 50. The back surface 46 may be formed with the two opposed ends of the metal skin 14, which are joined together at a seam 34. The seam 34 may join the ends of the metal skin 14, for example, by welding, adhesive, or fasteners. The two ends 38 of the metal skin 14 may overlap 36 in order to form a more secure joint to retain the form 12.

Still further description of an example of 6D will be provided in detail herein. The two ends 38 of the metal skin 14 overlap 36 to form the seam 34. In an example explained in further detail herein, adhesive tape 32, for example an acrylic adhesive tape, is positioned between the ends 38 to secure the ends to one another forming the seam 34.

In other constructions, the metal skin 14, which creates the form within which the form expands and cures, is constructed by two or more skin portions joined for example by welding, adhesive, adhesive tape, fasteners, or crimping. Once the metal skin is formed, defining an interior volume, the interior volume is filled with a polymer form. As the form is introduced to the interior volume, the form expands and fills the interior volume, while also solidifying into a solid form structure. Adhesive properties of the form in the liquid and expanding form, form a bond with the interior surfaces of the metal skin as the form solidifies and hardens.

These may include examples from 6A, 6B, and 6F. It will be recognized that example 6F and example 6A are similar. Each construction includes a first skin portion that includes three skin surfaces and a second skin portion that includes a further skin portion connected between ends of the first skin portion. Example 6A uses the second skin portion as the back surface while Example 6F uses the second skin portion as the top surface. It will be recognized in this way, these examples are mere rotations of the ramp about the lengthwise dimension of the ramp. Example 6F further shows that the first skin portion may be configured to extend about three sides of the ramp forming a generally "C" shape, while extending at least partially across a fourth side of the ramp With an area of overlap 36 between the two skin portions where the skin portions are joined at a seam 34. Still further review of the examples of FIGS. 6A, 6D, 6E, 6F, and 6G all provide examples with one skin portion having a generally "C" shape. In example 6G, each of the top surface, back surface, and side surfaces is a separate piece joined together to form the metal skin. The sides are exemplarily C-shaped with a seam 34 at a respective overlap between the side surface 48, 50 and the top surface 44 or back surface 46. It will be recognized that examples 6F and 6G may exemplarily be constructed using the adhesive tape 32 as described above with respect to FIG. 6D.

During use, a ramp, or any span must resist compression forces against the top surface and expansion forces across the back surface. If the force on the ramp exceeds the structure's ability to resist these forces, the ramp will buckle and fail. Examples of the ramps as described herein further include metal skins 14 with side surfaces 48, 50 secured between the top surface 44 an the back surface 46. In further examples, the top surface may be of a thicker metal skin than the metal skin of the back surface of the ramp. Aluminum of the qualities and dimensions described above exhibit little resistance to these compression and expansion forces, particularly as such aluminum is susceptible to bending. Polymer forms as described above provide rigidity and exhibit varying strengths at different form densities, however at similar dimensions also exhibit low durability and little resistance to these compression and expansion forces, when used as a ramp. Rather, when the form core is secured between the top surface and the back surface of the metal skin, the form core transfers the force between the top surface and the back surface distributing the force and greatly improving beam strength for the weight and span. The form core also resists bending of the metal skin of the top surface and back surface of the ramp, thereby strengthening that structure as well. However, a further challenge overcome in development of the presently disclosed ramp is further improvement of this mechanical system by fixing the tread, core and back of the ramp. In an example, this is achieved using an adhesive. However, metal and the polymer forms described herein have different thermal and expansion properties and therefore present a challenge for adequate bonding within a closed system. With such adhesives, the metal skin and the form core provide a single structural system, achieving the strength properties exhibited therein.

Figure 7A:
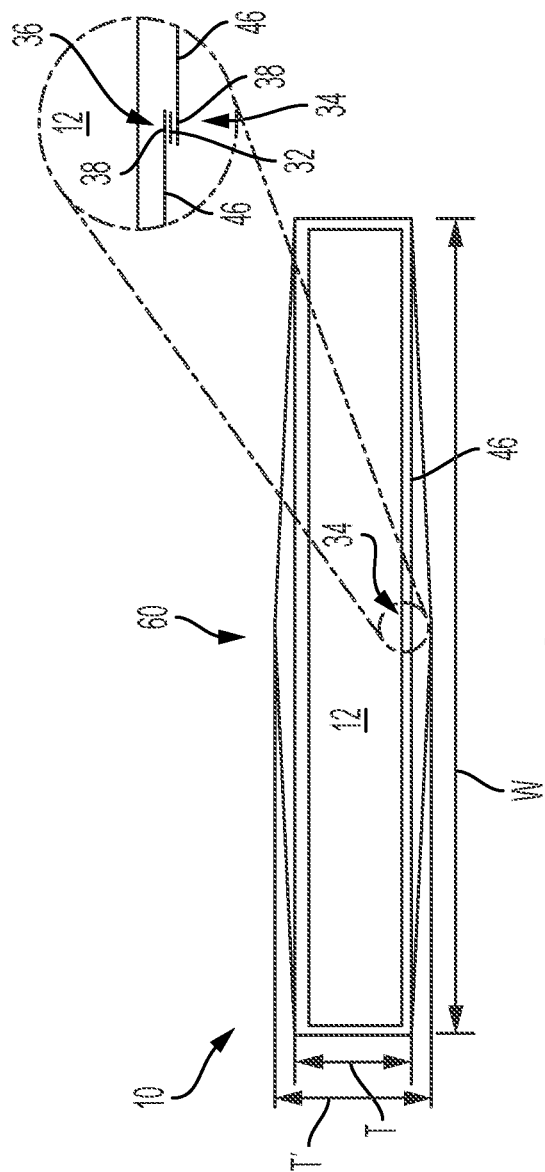
FIG. 7A is a schematic end view of an example of a ramp of the present construction.
Figure 7B:
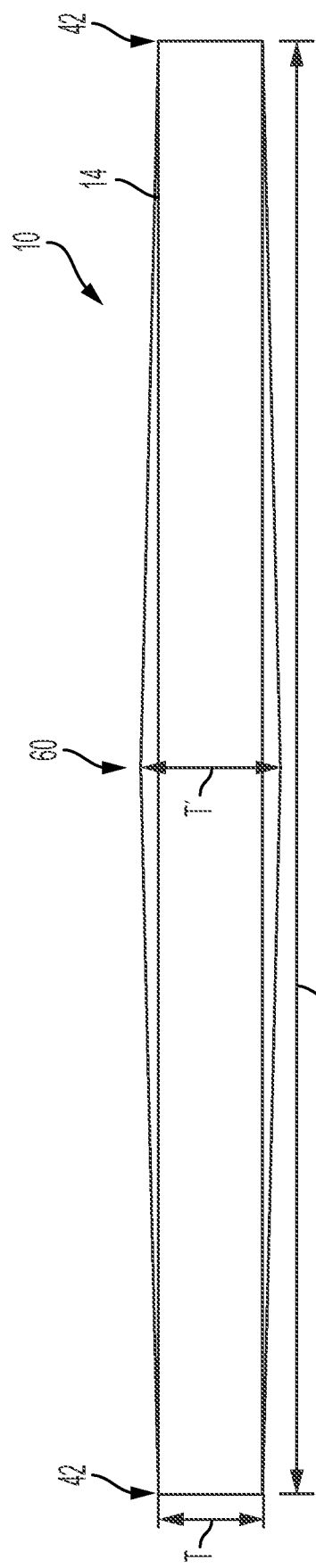
FIG. 7B is a schematic side view of an example of a ramp of the present construction.

FIGS. 7A and 7B depict a still further example of a ramp 10 of the construction as disclosed herein. FIG. 7A presents a schematic end view of the ramp 10, while FIG. 7B presents a schematic side view of the ramp 10. It is recognized that the view of FIG. 7A is equivalent to that of one of the ramp portions (e.g. 10A) of FIG. 3 and that the view of FIG. 7B is equivalent to that of FIG. 1. It is further recognized that all of the disclosure above as with respect to FIGS. 1 and 3 is similarly applicable and incorporated by reference herein to the example of the ramp 10 as provided by FIGS. 7A and 7B. For the sake of depicting the form core 12 within the metal skin 14, the ramp 10 of FIGS. 7A and 7B is depicted without hooks (e.g. 18 or 20 from FIG. 1) although it is recognized that such hooks or other hooks may be secured to the ends of the ramp 10 as previously described.

As depicted in FIGS. 7A and 7B, the ramp 10 is constructed with an increased thickness T' at the center 60 of the ramp 10 as compared to the thickness T at the ends 42 of the ramp 10. This tapering effect has been found to increase the strength of the ramp and the adhesion of the form core 12 to the metal skin 14 as will be described herein. In an example, the taper is between 0.00 in-0.12 in. per linear foot on each of the top surface and the back surface of the ramp in the lengthwise L dimension. In still further examples, the taper is between 0.05 in and 0.08 in per linear foot in the L dimension. It will be recognized that the L dimension is the same dimension along which the side surfaces of the metal skin 14 extend. As an example, the width dimension W is shown in FIG. 7A across the end showing the form core 12. In an example, a ramp of 4 feet in the L dimension may have an end thickness T of 0.72 in and a center thickness T' of 1.15 in., while in another example, a ramp of 6 feet in the L dimension may have an end thickness T of 0.72 in and a center thickness T' of 1.63 in. However, all of these are provided for merely exemplary purposes and additional dimensions and ratios of the disclosed taper in the ramp 10 will be recognized from the present disclosure and considered to be within the scope of the present disclosure.

While FIG. 7A depicts a similar taper in the width dimension W, it will be recognized that such taper may be more uniform across the width dimension, that is a greater portion, up to and including most or a substantial portion of the thickness T' may extend across the width dimension W, rather than a linear angle from the sides of the ramp to the center of the ramp 60. It will be similarly recognized that the taper in the L dimension may take shapes other than linear from T to T', including curves, splines, logarithmic, exponential, or compound shapes.

The inset of FIG. 7A provides a more detailed view of the joint 34 in the metal skin 14. It will be recognized that the inset of FIG. 7A provides a detailed view similar to that of example 6D as described above, the description of which is similarly applied to FIG. 7A. In the inset of FIG. 7A, the ends 38 of the metal sheet 14, specifically the ends 38 at portions of the back surface 46 are overlapped at 36. An adhesive tape 32, as will be described above and in further detail herein, is positioned therebetween to secure the ends 38 in a joint 34.

Figure 8:
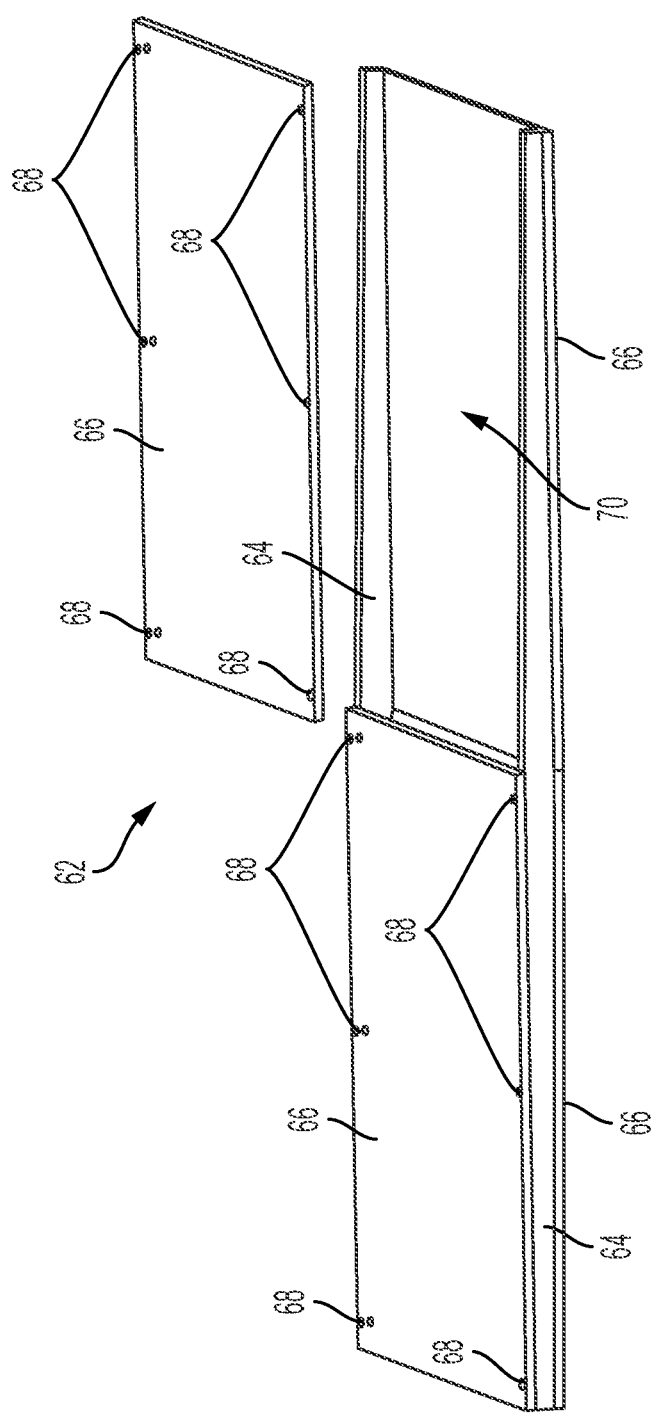
FIG. 8 depicts an example of an injection fixture as may be used in an example method of constructing a ramp.
Figure 9:
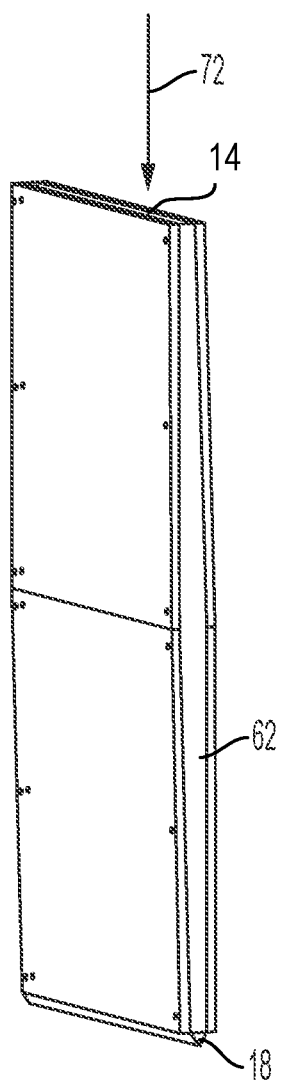
FIG. 9 depicts an example of the injection fixture during use in construction of a ramp.

With respect to FIGS. 8 and 9, further details of an example of the construction of the ramp 10 are described herein. FIG. 8 depicts an example of an injection fixture 62 as may be used in the construction of the ramp 10 as described herein. The injection fixture 62 includes tapered sidewalls 64 which exemplarily match the taper of the ramp 10 (e.g. FIG. 7B) to be constructed. The injection fixture 62 further includes removable covers 66. In an example, each run from an end to the center of the sidewalls 64 is associated with a cover 66. Each cover 66 may be removably secured to the sidewalls 64, for example, with fasteners 68, which may exemplarily be bolts. In practice, the covers 66 on one side of the sidewalls 64 may remain connected to the sidewalls 64, while the covers 66 on the opposing side are removed, one such cover 66 is shown separated from the rest of the injection fixture 62 to show the open interior 70 of the injection fixture 62 defined therein.

Figure 6A:
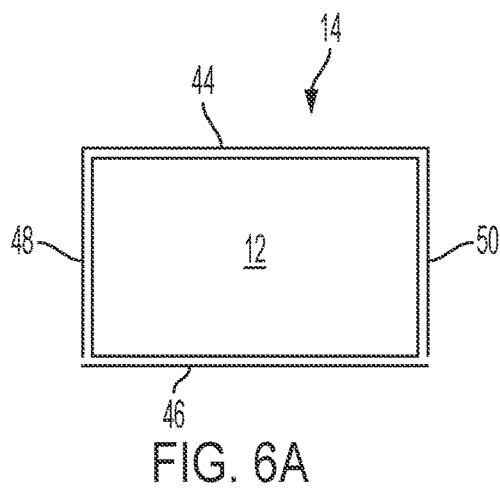
FIG. 6A-6G present a variety of cross-sections of ramps of the present construction.
Figure 6B:
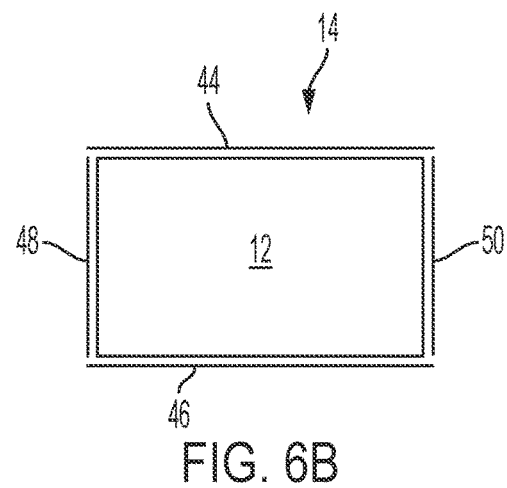
Figure 6C:
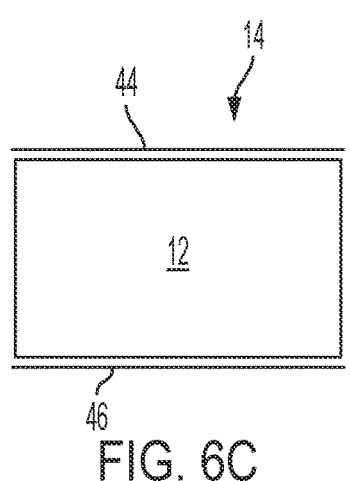
Figure 6D:
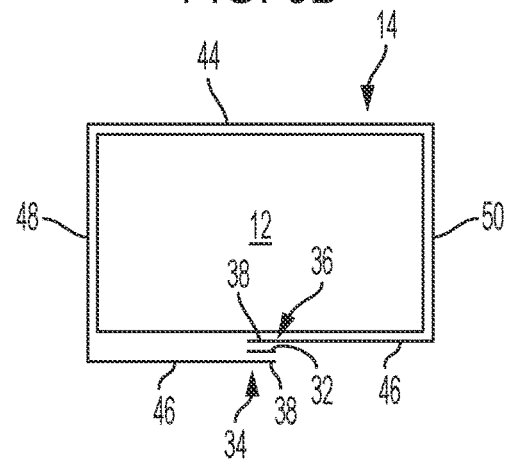
Figure 6E:
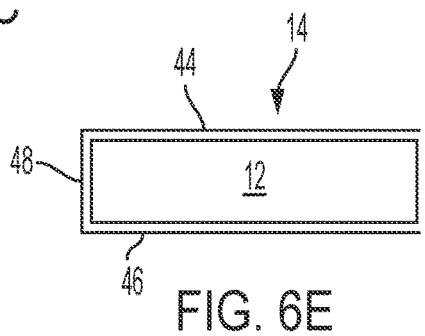
Figure 6F:
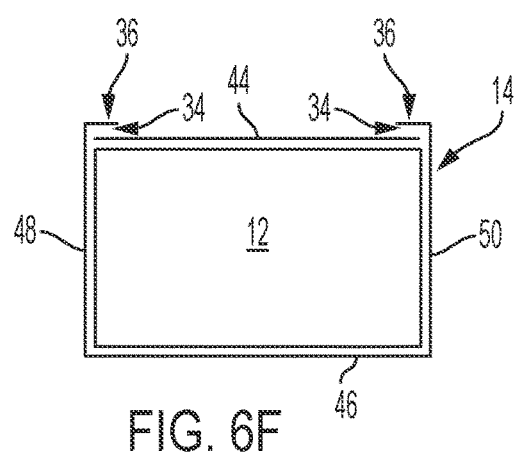
Figure 6G:
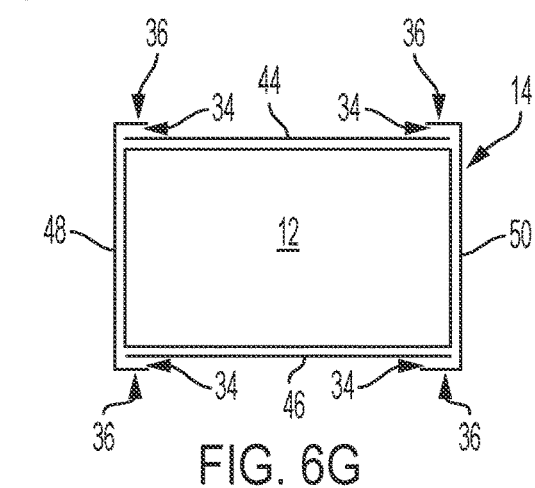

The metal skin 14, exemplarily as shown in FIG. 6D or 7A, is positioned within the open interior. In a further example, the metal skin 14 is constructed of a unitary piece of bent metal to form the surfaces of the metal skin 14. In a still further example, the unitary piece of bent metal may be bent at angles greater than 90 degrees, such that as the metal skin 14 is positioned into the open interior 70 of the injection fixture, the metal skin 14 is placed under tension and further bent into position. An adhesive tape as described above, for example an acrylic adhesive tape, is positioned on one of the ends 38 of the metal skin 14 and secures the ends 38 of the metal skin, as the covers 66 which had been removed to provide access into the open interior 70 are replaced and secured to the sidewalls 64 by fasteners 68. With the metal skin 14 secured within the open interior 70 of the injection fixture 62, the metal skin 14 is ready to be filled with the form core 12.

FIG. 9 depicts an example of the injection fixture 62 in use in construction of a ramp 10 as described herein. It will be noted that in FIG. 9, the injection fixture 62 has been turned vertically or near-vertically. One hook 18, has been secured to an end of the metal skin 14. The hook 18 may be secured by one or more of mechanical fasteners, welding, adhesive, or adhesive tape, as previously described. Alternatively, or in addition, the hook 18 may be held in position to be adhered to the metal skin 14 fully or at least partially by the form core. In such an example, the form, in a liquid state is injected into the metal skin 14 within the injection fixture 62 in the direction of arrow 72. In an example, some form is injected into the injection fixture 62 and given a nominal time period to at least partially set, securing or helping to secure the hook 18 to the end of the metal skin 14 within the injection fixture 62. In any example, the securement of the hook 18 across the end of the metal skin 14 forms a barrier against further expansion of the liquid form (as the liquid form expands and cures into a solid) in the direction of the hook 18, or out of the bottom of the vertically-oriented injection fixture 62.

Further form is injected in the liquid state into the metal skin 14 within the injection fixture 62 in the direction of arrow 72. As the liquid form expands and cures into a solid, pressure of the form within the metal skin 14 increases, this pressure from the expanding form deforms the metal skin to expand into the additional space defined by the sidewalls 64 of the injection fixture 62. This provides the taper in the ramp 10 as described above with respect to FIGS. 7A and 7B. When the expanded form reaches the half-way or thickest part of the injection fixture, the covers 66 begin to angle closer together towards the top end of the injection fixture 62. This narrowing of the open interior 70 further creates a back pressure against the metal skin, forcing the metal against the covers 66 and the sidewalls 64, deforming the metal skin into the shape defined by the injection fixture 62. When the expanding form reaches the top end of the injection fixture 62, the other hook (not depicted) is secured to the metal skin 14 at that end. The other hook is as previously described and may be secured to the metal skin in any of the ways as described above, including, at least partially, by the form. Securement of the other hook at this second end of the metal skin 14 helps to maintain the expanding form under pressure within the metal skin until the form cures and hardens.

In an example, the injection fixture 62 is heated, exemplarily to a temperature of 150° F. The preheating of the injection fixture 62 has been found to prolong the curing process of the form, forming a stronger bond between the form and the metal skin 14. In still further examples, the interior surface of the metal skin may be abraded by sanding, or laser or chemical etching to promote further adhesion between the form and the metal skin 14.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A ramp having first and second ends, the ramp comprising:

a foam core having a first core surface and a second core surface;

a metal skin secured to and surrounding the foam core, the metal skin forming a top surface secured to the first core surface, a bottom surface secured to the second core surface, and opposed side surfaces between the top surface and the bottom surface, wherein the foam core is solid and unitary interior of the metal skin; and a first hook secured at the first end of the ramp, the first hook comprising a first fastening plate and a second fastening plate spaced apart from the first fastening plate, wherein the metal skin and the foam core are secured between the first fastening plate and the second fastening plate with the first fastening plate secured to the top surface of the metal skin and the second fastening plate secured to the bottom surface of the metal skin; and a second hook secured at the second end of the ramp, the second hook comprising a third fastening plate and a fourth fastening plate spaced apart from the third fastening plate, wherein the metal skin and the foam core are secured between the third fastening plate and the fourth fastening plate with the third fastening plate secured to the top surface of the metal skin and the fourth fastening plate secured to the bottom surface of the metal skin;

wherein the first hook defines a first thickness of the combined metal skin and the foam core at the first end of the ramp between the top surface and the bottom surface of the metal skin and the second hook defines the first thickness of the combined metal skin and the foam core at the second end of the ramp between the top surface and the bottom surface of the metal skin;

wherein the ramp increases in a thickness dimension from the first thickness to a second thickness of the combined metal skin and the foam core between the top surface and the bottom surface of the metal skin at a center of the ramp in a lengthwise dimension and the ramp increases in the thickness dimension from the first thickness at the second end of the ramp to the second thickness at the center of the ramp; and wherein the second thickness is greater than the first thickness.

2. The ramp of claim 1, wherein the foam core is a cellular foam of at least one material selected from polypropylene, polyisoprene, polystyrene, polyethylene, polyurethane, and polyurea.

3. The ramp of claim 1, wherein the foam core is constructed of expansive foam injected into an interior defined by the metal skin.

4. The ramp of claim 3, wherein the foam core comprises polyurethane or polyurea.

5. The ramp of claim 1, wherein the metal skin is a unitary piece of aluminum with a thickness between 16 gauge and 24 gauge, the unitary piece of aluminum bent to form the top surface, the bottom surface, and the opposed side surfaces between the top surface and the bottom surface.

6. The ramp of claim 5, wherein the metal skin defines an interior surface and an exterior surface and the interior surface is abraded, the metal skin defining an open interior, and the foam core is constructed of an expansive foam injected into the open interior which adheres to the interior surface of the metal skin upon curing to the solid foam core, wherein the abraded interior surface promotes adhesion between the expansive foam and the interior surface of the metal skin.

7. The ramp of claim 5, wherein the unitary piece of aluminum of the metal skin comprises lengthwise edges that overlap along the second surface of the foam core in the lengthwise dimension, and further comprising an acrylic adhesive tape that secures the overlapping edges of the metal skin to define the open interior.

8. The ramp of claim 1, wherein the opposed side surfaces of the metal skin define the first thickness of the combined metal skin and the foam core at opposed sides of the ramp;
wherein the ramp increases in the thickness dimension from the first thickness at the opposed sides of the ramp to the second thickness of the combined metal skin and the foam core at the center of the ramp in the widthwise dimension.

9. The ramp of claim 1, wherein the ramp is constructed within an injection fixture comprising covers removably secured to sidewalls, the injection fixture defining an open interior which is configured to receive the metal skin and to hold the metal skin under tension, wherein the foam is an expansive foam injected interior of the metal skin within the injection fixture, wherein as the expansive foam expands and cures, the expansive foam adheres to the metal skin and deforms the metal skin outwards against the covers of the injection fixture.

10. The ramp system of claim 1, further comprising a handle secured to the metal skin.

11. The ramp of claim 1, wherein the top surface bows outward between the first end and the second end, and the bottom surface bows outward between the first end and the second end.

12. The ramp of claim 8, wherein the top surface bows outward between the first end and the second end, and the bottom surface bows outward between the first end and the second end; and
wherein the top surface bows outward between the opposed sides of the ramp, and the bottom surface bows outward between the opposed sides of the ramp.

13. The ramp of claim 1, further comprising a hinge that connects the metal skin of the ramp to an adjacent ramp portion.

14. A ramp having first and second ends, the ramp comprising:
a metal skin constructed of a unitary piece of aluminum with a thickness between 16 gauge and 24 gauge, the unitary piece of aluminum bent to form a top surface, a bottom surface, and opposed side surfaces between the top surface and the bottom surface and defining an open interior, the metal skin having an interior surface and an exterior surface and the interior surface is abraded;
a solid foam core extending unobstructed within the open interior between the top surface, the bottom surface, and the opposed side surfaces, the solid foam core constructed of an expansive foam injected into the open interior which adheres to the interior surface of the metal skin upon curing to secure a first core surface to the top surface and a second core surface to the bottom surface, wherein the abraded interior surface promotes adhesion between the expansive foam and the interior surface of the metal skin;

a first hook comprising a first fastening plate and a second fastening plate spaced apart from the first fastening plate, wherein the metal skin and the foam core at the first end of the ramp are secured between the first fastening plate and the second fastening plate with the first fastening plate secured to the top surface of the metal skin and the second fastening plate secured to the bottom surface of the metal skin, the first hook defining a first thickness of the combined metal skin and the foam core at the first end of the ramp between the top surface and the bottom surface of the metal skin; and a second hook comprising a third fastening plate and a fourth fastening plate spaced apart from the third fastening plate, wherein the metal skin and the foam core at the second end of the ramp are secured between the third fastening plate and the fourth fastening plate with the third fastening plate secured to the top surface of the metal skin and the fourth fastening plate secured to the bottom surface of the metal skin, and the second hook defines the first thickness of the combined metal skin and the foam core at the second end of the ramp between the top surface and the bottom surface of the metal skin;

wherein the ramp increases in a thickness dimension from the first thickness at the first end of the ramp to a second thickness of the combined metal skin and the foam core between the top surface and the bottom surface of the metal skin at a center of the ramp in a lengthwise dimension and the ramp increases in the thickness dimension from the first thickness at the second end of the ramp to the second thickness at the center of the ramp, wherein the second thickness is greater than the first thickness.

15. The ramp of claim 14, wherein opposed side surfaces of the metal skin define the first thickness of the combined metal skin and the foam core at opposed sides of the ramp; and
wherein the ramp increases in the thickness dimension from the first thickness at the opposed sides of the ramp to the second thickness of the combined metal skin and the foam core at the center of the ramp in a widthwise dimension.

* * * * *